Feb. 5, 1952  L. L. SALFISBERG  2,584,815
POWER-OPERATED HYDRAULIC SEALER AND CRIMPER
Filed June 26, 1948  9 Sheets-Sheet 1

Inventor:
Leroy L. Salfisberg.
BY
Harry B. Cook,
Attorney.

Feb. 5, 1952 L. L. SALFISBERG 2,584,815
POWER-OPERATED HYDRAULIC SEALER AND CRIMPER
Filed June 26, 1948 9 Sheets-Sheet 4

Inventor:
Leroy L. Salfisberg
BY
Attorney.

Feb. 5, 1952          L. L. SALFISBERG          2,584,815
POWER-OPERATED HYDRAULIC SEALER AND CRIMPER
Filed June 26, 1948          9 Sheets-Sheet 5

Inventor:
Leroy L. Salfisberg
BY
Harry B. Cook,
Attorney.

Feb. 5, 1952 L. L. SALFISBERG 2,584,815
POWER-OPERATED HYDRAULIC SEALER AND CRIMPER
Filed June 26, 1948 9 Sheets-Sheet 6

Fig. 8

Inventor:
Leroy L. Salfisberg
BY
Harry N. Cook,
Attorney.

Feb. 5, 1952 L. L. SALFISBERG 2,584,815
POWER-OPERATED HYDRAULIC SEALER AND CRIMPER
Filed June 26, 1948 9 Sheets-Sheet 8

Inventor:
Leroy L. Salfisberg
BY
Harry B. Cook,
Attorney.

Feb. 5, 1952      L. L. SALFISBERG      2,584,815
POWER-OPERATED HYDRAULIC SEALER AND CRIMPER Filed June 26, 1948      9 Sheets-Sheet 9

Inventor:
Leroy L. Salfisberg
BY
Harry B. Cook
Attorney.

Patented Feb. 5, 1952

2,584,815

UNITED STATES PATENT OFFICE 2,584,815

POWER-OPERATED HYDRAULIC SEALER AND CRIMPER

Leroy L. Salfisberg, South Orange, N. J., assignor, by mesne assignments, to Ivers-Lee Company, Newark, N. J., a corporation of Delaware Application June 26, 1948, Serial No. 35,458

14 Claims. (Cl. 154—42)

This invention relates particularly to a machine for sealing together layers of packaging material for making or closing packages or for attaching labels or covers to packages, although the invention may be embodied in other types of machines where it is desired to exert pressure on one or more layers of material.

In my copending application Serial No. 594,289, filed May 17, 1945, now Patent No. 2,476,629, I have disclosed a generally similar machine that includes a pair of jaws to receive and press layers of material between them, at least one jaw being initially actuated toward the other under low hydraulic pressure to grip the material to be pressed between the jaws, and thereafter the movable jaw is subjected to higher hydraulic pressure for a predetermined period of time to complete the pressing operation. In that machine, the hydraulic pressure is provided by a pump driven by an electric motor, and during operation of the machine the pump is continually operated against pressure, that is, hydraulic pressure is continuously provided by the pump, and the application of the hydraulic pressure to the jaws is controlled more or less automatically and incidentally to the movement of the operator's hands during the insertion of the layers of material or package between the jaws.

One object of the present invention is to provide a machine of the same general type as that described in my said application but wherein the hydraulic pressure shall be generated only at the time of operation of the jaws, and normally, when the jaws are idle, the pump shall operate under substantially no pressure.

Another object is to provide in such a machine novel and improved means for controlling the initial closing of the jaws under relatively low pressure and the subsequent application of higher hydraulic pressure to the jaws to complete the pressing, sealing or crimping operation.

Another object of the invention is to provide in a machine of this character, novel and improved means such that if the operator's fingers or another object should be accidentally inserted between the jaws when the machine is manually started into operation, closing of the jaws will be prevented, and due to the low hydraulic pressure then actuating the jaws, no substantial injury to the fingers of the operator, or to the object between the jaws, or to the machine, can occur.

A further object is to provide novel and improved means for easily and quickly regulating the higher hydraulic pressure, whereby the final pressure applied to the jaws can be varied in accordance with the requirements of the particular operation or the nature of the material being operated upon.

Still another object of the invention is to provide a machine of the specific character described which shall embody novel and improved features of construction whereby the major portion of the closing movement of the jaws shall be effected by relatively low hydraulic pressure, and high hydraulic pressure shall be required for operating the jaws only during a minor portion of the closing thereof, whereby to ensure economy in the use of power.

A further object is to provide novel and improved starting mechanism for the machine such that the operator's hands during insertion of the work between the jaws shall actuate an electric switch that shall in turn control electromagnetic mechanism for actuating a starting valve in the hydraulic apparatus.

Still another object of the invention is to provide in a power driven hydraulic crimping and sealing machine of this character, novel and improved means for predetermining and regulating the duration of the period of application of the high pressure to the jaws and for automatically relieving the jaws of that pressure at a predetermined time to accommodate different conditions of operation and different kinds of materials being operated upon.

It is another object of the invention to provide novel and improved means for adjusting the two jaws of the machine relatively to each other and to their supporting structure to vary the normal space between the jaws and also to permit the jaws to close with their gripping faces approximately in a vertical plane or in a horizontal plane or in planes oblique to the horizontal, to adapt the machine to different types of operations.

Other objects of the invention are to provide a power operated hydraulic sealer and crimper which shall be simple, inexpensive and reliable in construction and operation, and to obtain other advantages and results that will be brought out by the following description in conjunction with the accompanying drawings, in which:

Figures 1, 19, 20:
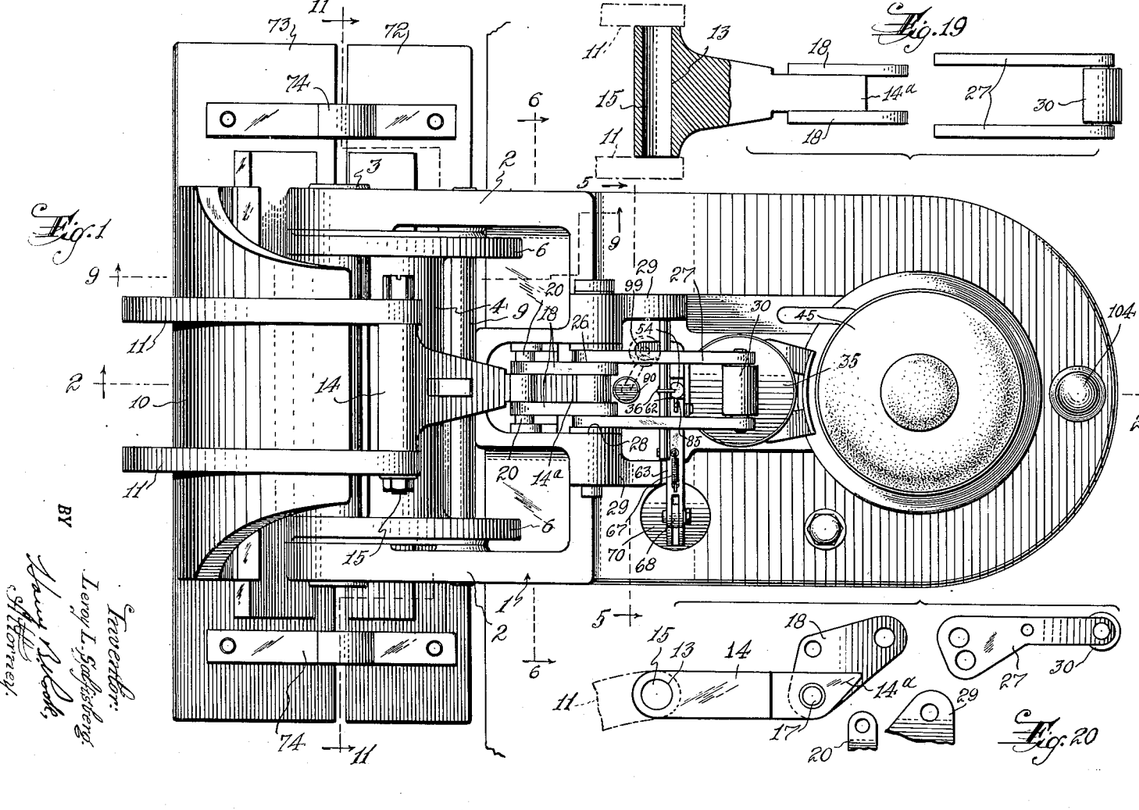
Figure 1 is a top plan view of a machine embodying my invention, showing the machine in idle condition.
Figure 19 is a composite plan view of the linkage between the hydraulic pistons and the jaws.
Figure 20 is a side elevational view of the parts shown in Figure 19.
Figure 2:
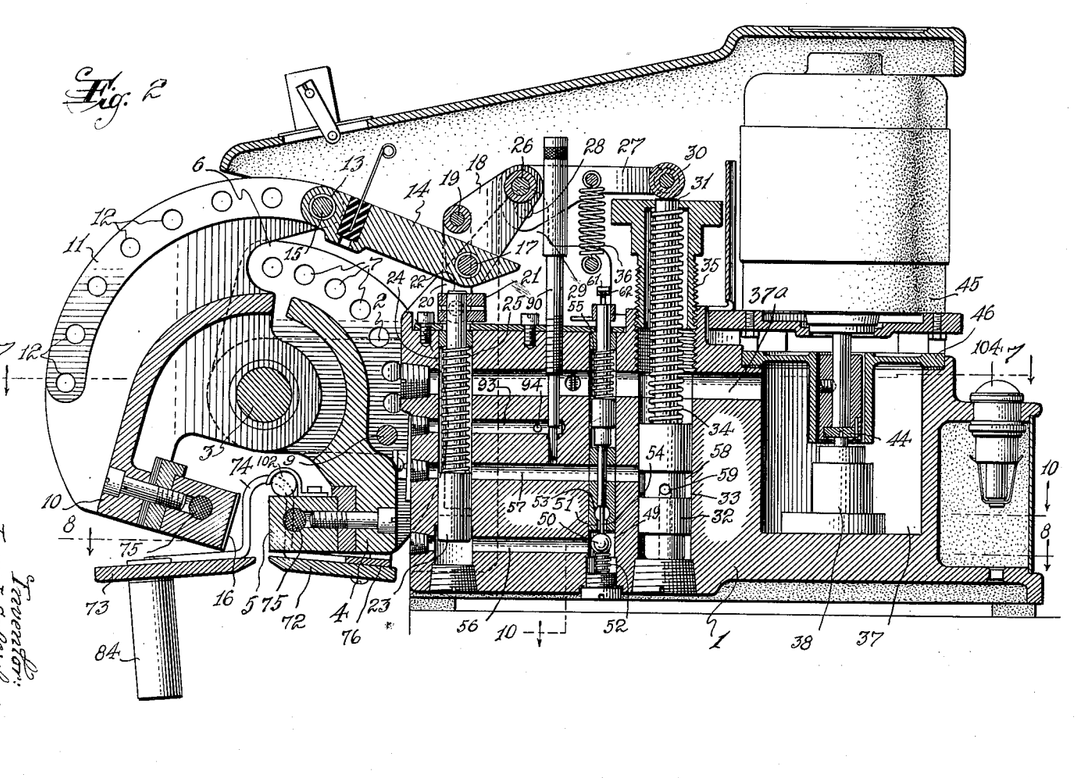
Figure 2 is a central vertical longitudinal section view, taken approximately on the plane of the line 2—2 of Figure 1.
Figure 21:
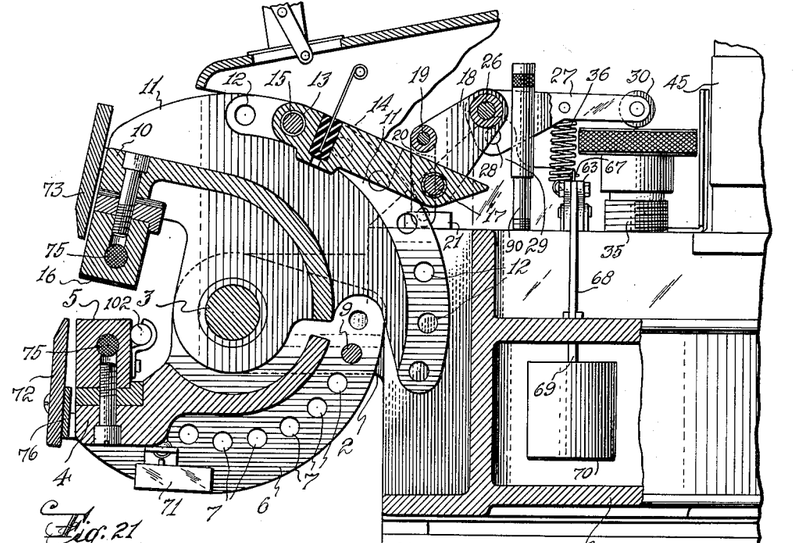
Figure 21 is a fragmentary composite central sectional and side elevational view of a modification of the invention.

Specifically describing the invention, the reference character 1 designates the frame of the machine which may be a casting and is constructed to be set and fastened upon a table or like support. At the front of the frame project horizontally spaced arms 2 in and between which is mounted a shaft 3 on which a jaw 4 is mounted so that it may be rotated about the axis of the shaft to locate the gripping face 5 of the jaw selectively approximately in a vertical plane, as shown in Figure 2, or in a horizontal plane, as shown in Figure 21, or in planes oblique to the horizontal, to adapt the machine to different types of operations. The jaw may be held in the desired position in any suitable manner, but as shown, the jaw has an arcuate flange 6 at each end thereof in which is an arcuate row of openings 7 concentric with the shaft 3 to register selectively with openings 8 in the juxtaposed arms 2 of the frame so that a pin 9 may be inserted through the registering openings to stationarily lock the jaw in the adjusted position.

Cooperating with the jaw 4 is a movable jaw 10 that is also rotatable on the shaft 3 and has arcuate flanges 11 each of which has an arcuate row of openings 12 to selectively register with an opening 13 in one end of a toggle link 14 to receive a pivot pin 15 for pivotally connecting the jaw to said link. With this construction, the movable jaw 10 can be adjusted about the shaft 3 to correspond to the position of the stationary jaw 4, as shown in Figures 2 and 21, and may also be adjusted to vary the distance between the gripping face 5 of the stationary jaw and the gripping face 16 of the movable jaw.

In accordance with the invention, the movable jaw 10 is actuated by power driven hydraulic mechanism, and as shown, the other end of the toggle link 14 is pivotally connected at 17 to one end of a double toggle link 18 which is pivotally connected at 19 to and between thrust links 20 that are also pivotally connected to a head block 21 that is pinned on the end of the piston rod 22 of an auxiliary hydraulic piston 23 which is reciprocable in a vertical cylinder 24 in the frame of the machine and is normally actuated downwardly by a compression spring 25.

The other end of the link 18 is pivotally connected at 26 to a double actuating bell crank 27 that is pivotally mounted at 28 on upstanding bracket arms 29 at the top of the frame of the machine. The actuating bell crank 27 has a roller 30 that engages the upper end of the piston rod 31 of a main hydraulic piston 32 which is reciprocable in a vertical cylinder 33 in the machine frame and is normally actuated downwardly by a compression spring 34 the force of which is adjustable by a tubular screw plug 35.

Figure 3:
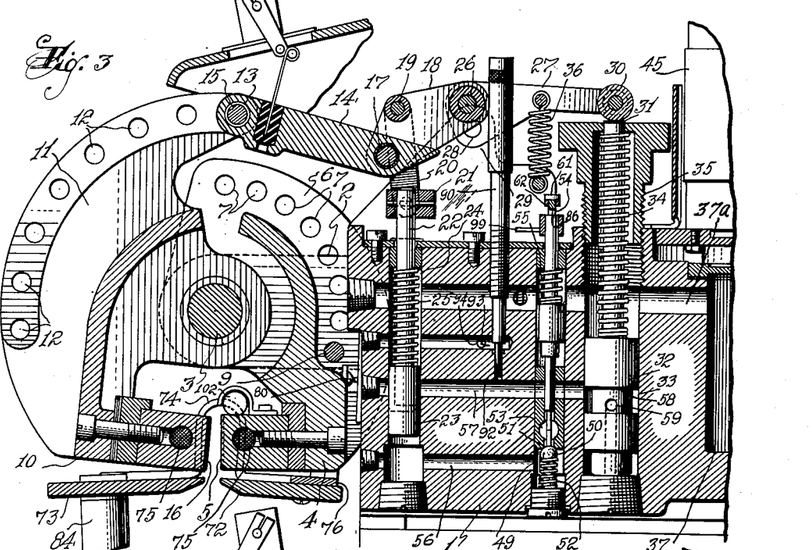
Figure 3 is a fragmentary central vertical sectional view, like Figure 2, but showing the positions of the parts during the initial closing movement of the jaws.
Figure 4:
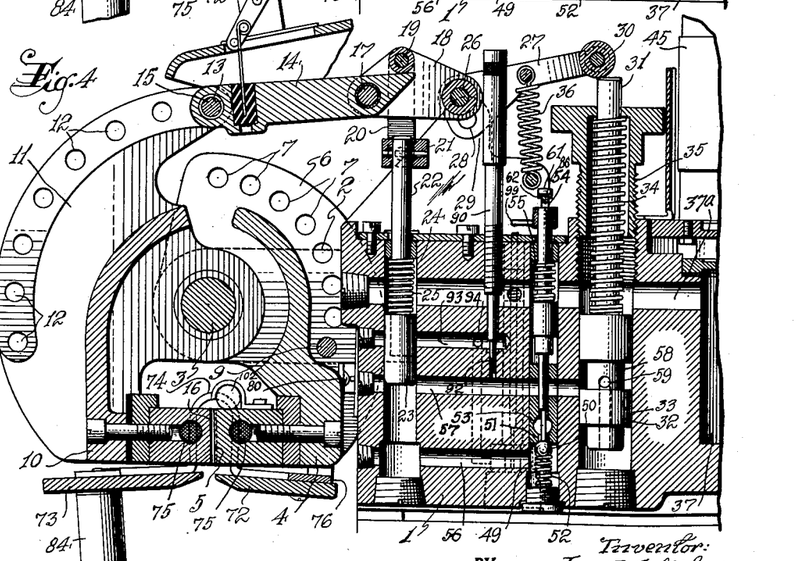
Figure 4 is a similar view showing the position of the parts with the jaws completely closed and subject to the higher hydraulic pressure.

Normally, the two pistons 23 and 32 are at the lower ends of their strokes and the jaws are open, as shown in Figure 2. To close the jaws, low hydraulic pressure is applied to the auxiliary piston 23 to force the same upwardly and thereby lift the toggle link 18 and swing the movable jaw 10 toward the stationary jaw 4, as shown in Figure 3. Assuming that there is no obstruction to the closing of the jaws, for example, the fingers of the operator between the jaws, the auxiliary piston continues to move upwardly until the the tail or end 14a of the toggle link 14 opposite the connection of the link to the jaw abuttingly underlies the pivot pin 19, after which hydraulic pressure is applied to the main hydraulic piston 32 so as to force the same upwardly, and through the actuating bell crank 27 and the toggle link 18 apply high hydraulic pressure to the movable jaw, as shown in Figure 4. Upon release of the hydraulic pressure, the pistons are returned to their normal lower positions by their respective springs 25 and 34 and the actuating bell crank 27 is swung to its normal position by a tension spring 36, so as to open the jaws, that is, so as to swing the movable jaw 10 away from the stationary jaw 4.

For generating the required hydraulic pressure, I have provided in the frame 1 a reservoir 37 for liquid such as oil, the upper end of which is connected by a common passage 37a with all of the piston cylinders above the pistons. Mounted on the bottom of this reservoir is a pump 38 of any suitable construction for forcing the oil under pressure from the reservoir to the operating pistons. As shown, this pump is of the gear type and includes a casing secured on the bottom of the reservoir by pins 39 and having a pump chamber 40 in which are rotatable gears 41 that are mounted on the respective shafts 42 and 43 that project upwardly into the casing. As shown, the shaft 43 is coupled at 44 to the shaft of an electric motor 45 which is secured on the top plate 46 of the reservoir 37. The pumping chamber 40 has an inlet passage 47 leading from the reservoir and an outlet passage 48 that leads to a valve chamber 49 in which is a ball valve 50 that controls a valve port 51 and is normally moved into closed position with the pressure from the pump and by a spring 52. The valve port 51 is connected by a passage 53 to the reservoir 37.

The valve 50 is normally held in open position by an actuating rod 54 which is normally operated by a spring 55 in the direction to open said valve. While the valve 50 is open, the liquid from the reservoir is freely circulated by the pump from the reservoir through the outlet 48 past the valve 50, through the valve port 51 and passage 53 back to the reservoir, the pump thus operating under substantially no pressure. However, when the valve 50 is closed, pressure is built up by the pump in the outlet 48 and is conducted through a duct 56 to the auxiliary piston cylinder 24 beneath the piston 23 so as to force said piston upwardly as shown in Figure 3. The piston 23 will continue to move upwardly until it uncovers a duct 57 which connects the cylinder 24 with the main piston cylinder 33, whereupon the fluid pressure is admitted to the main cylinder and passes through a circumferential channel 58 and a duct 59 that leads to the lower end of the cylinder beneath the piston, whereupon said main piston will be forced upwardly against the spring 34 to apply hydraulic pressure to the jaws, as shown in Figure 4. By screwing downwardly on the adjusting plug 35, the spring may be caused to exert greater pressure or resistance on the piston and thus reduce the pressure applied by the piston to the movable jaw.

For safety, a check valve controlled by-pass 60 is provided between the outlet passage 48 and the liquid return passage 53.

Figure 5:
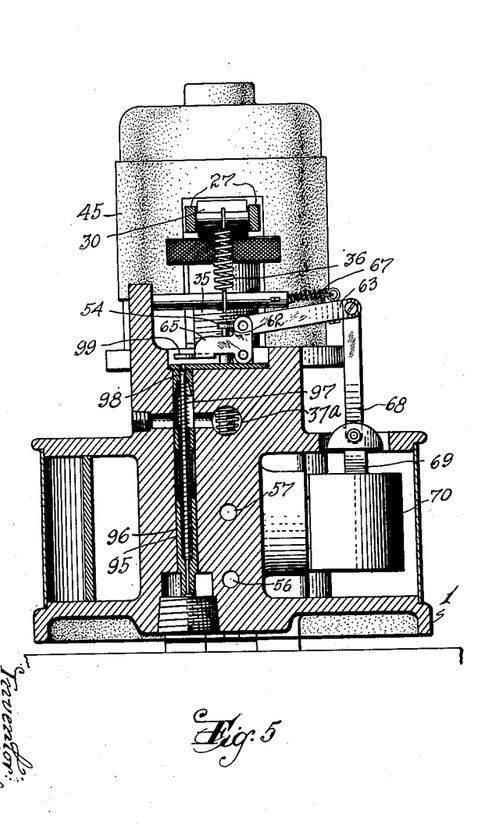
Figure 5 is a transverse vertical sectional view, approximately on the plane of the line 5—5 of Figure 1.
Figure 6:
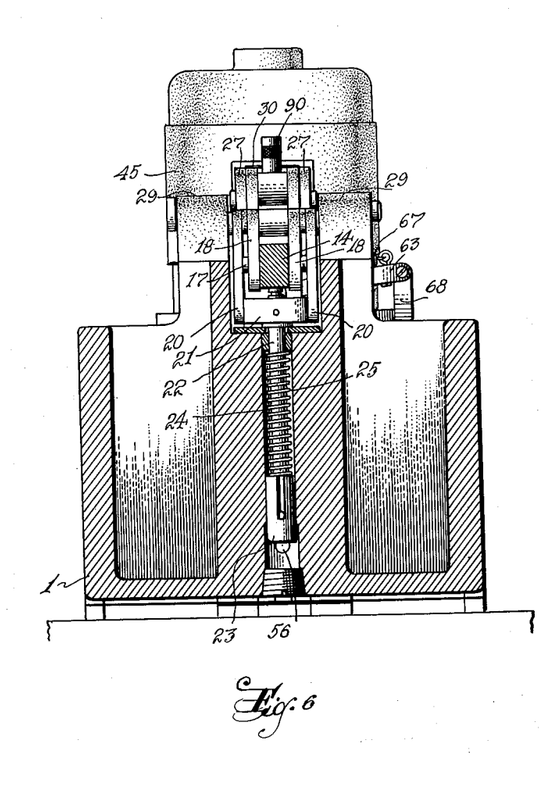
Figure 6 is a similar view, approximately on the plane of the line 6—6 of Figure 1.
Figures 7, 17, 18:
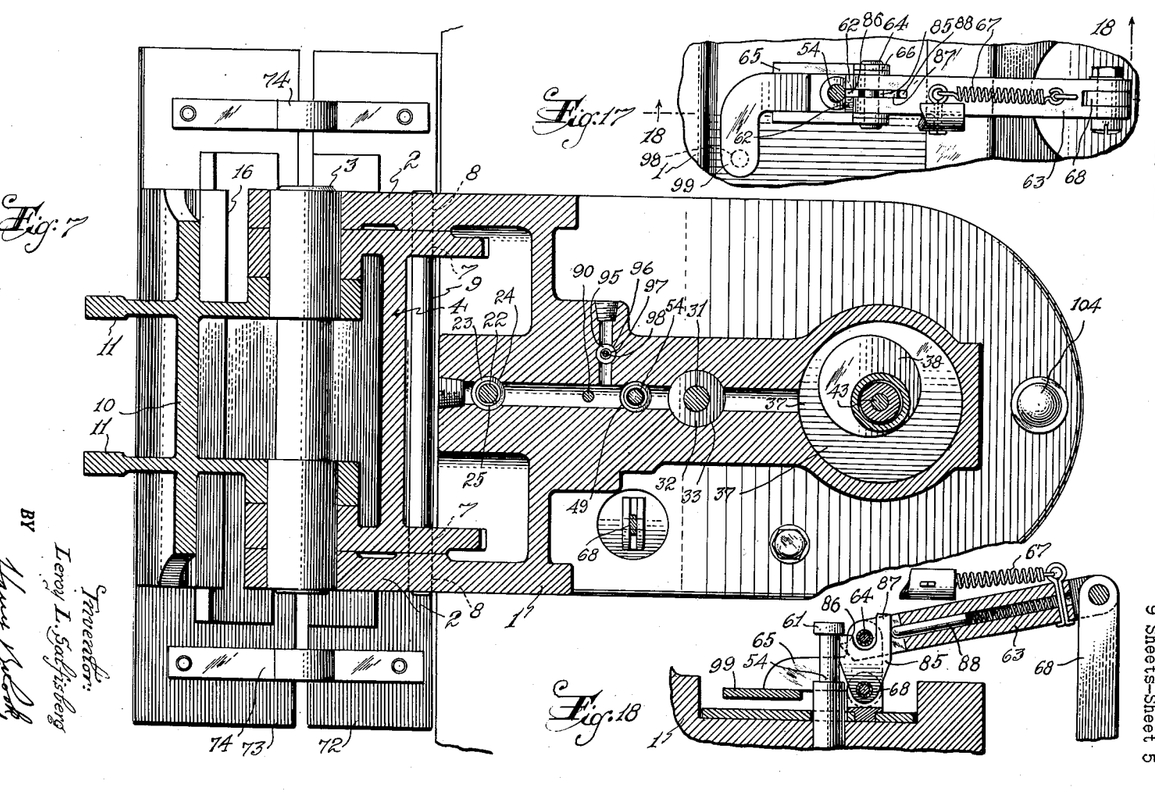
Figure 7 is a horizontal sectional view, approximately on the plane of the line 7—7 of Figure 2.
Figure 17 is an enlarged fragmentary plan view of the starting valve actuating mechanism.
Figure 18 is a vertical sectional view, approximately on the plane of the line 18—18 of Figure 17.
Figure 8:
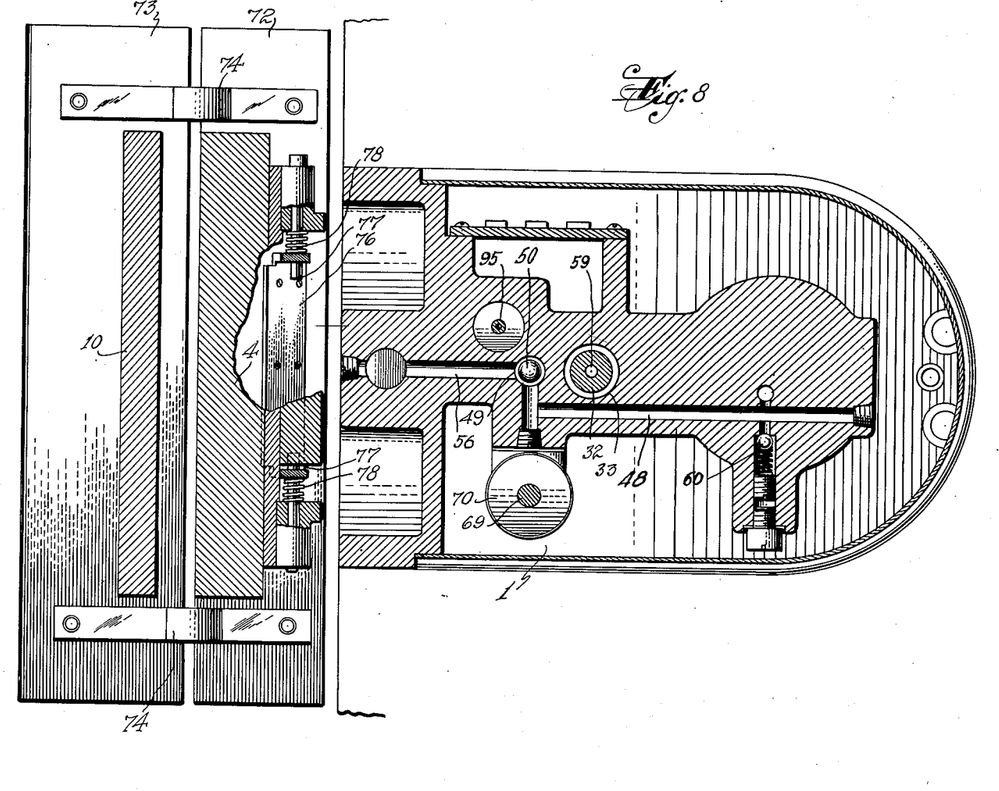
Figure 8 is a similar view, approximately on the plane of the line 8—8 of Figure 2.
Figures 9, 10, 11, 12:
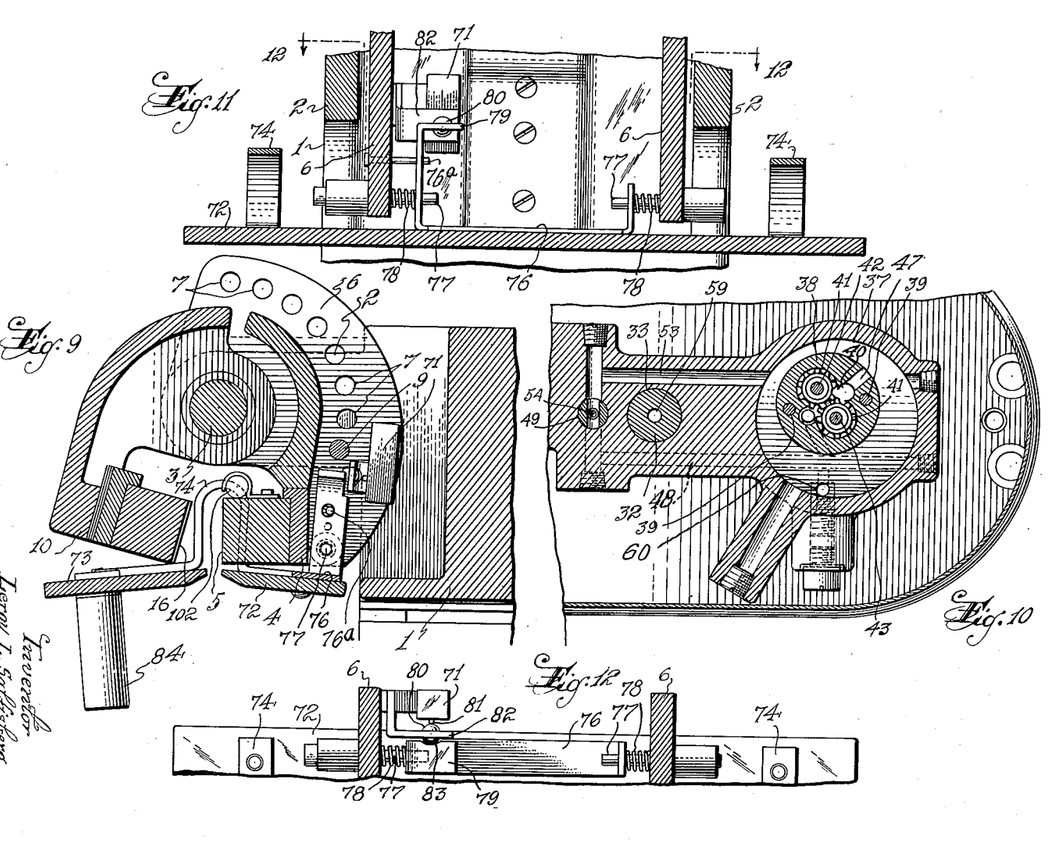
Figure 9 is a fragmentary vertical sectional view, approximately on the plane of the line 9—9 of Figure 1.
Figure 10 is a fragmentary horizontal sectional view, approximately on the plane of the line 10—10 of Figure 2.
Figure 11 is a fragmentary transverse vertical sectional view, on the plane of the line 11—11 of Figure 1.
Figure 12 is a horizontal sectional view, approximately on the plane of the line 12—12 of Figure 11.
Figure 16:
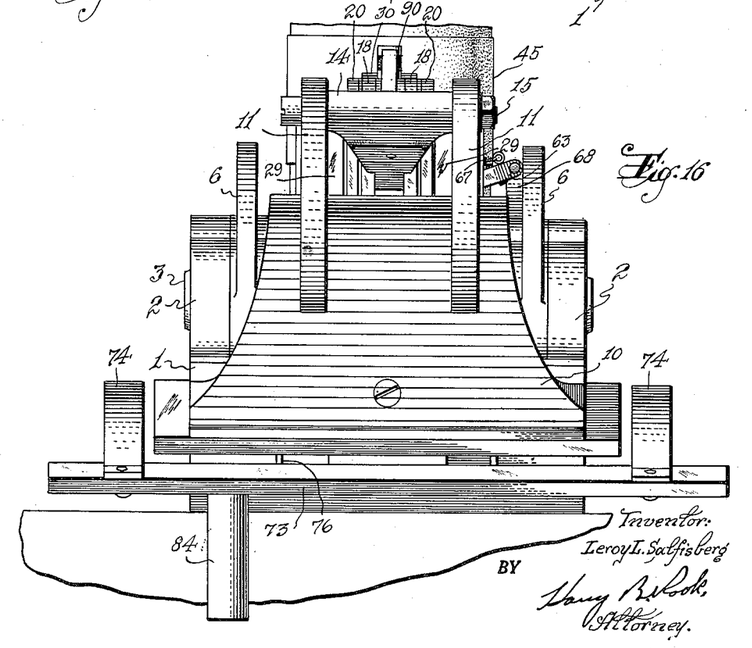
Figure 16 is a front elevational view of the machine.

The valve 50 is the starting valve and is automatically released into closed position by electromagnetic mechanism controlled by the movement of the hand of the operator incident to placing work between the jaws. As shown best in Figures 5, 17 and 18, the upper end of the actuating rod 54 has a head 61 the underside of which is normally abuttingly engaged by teeth 62 on the end of a trip lever 63 that is pivotally connected intermediate its ends at 64 on a bell crank 65 which is in turn pivoted at 66 on a bracket secured to the top of the machine frame. As shown, the trip lever 63 is influenced by a tension spring 67 to hold the teeth 62 in engagement with the actuating rod 54. The end of the lever 63 opposite the pivot 64 is connected by a link 68 to the armature 69 of an electromagnet 70 which is mounted on one side of the frame, as best shown in Figure 5. The winding of this electromagnet is connected in an electric circuit (see Figure 22) with a normally open micro-switch 71 which is mounted on the rear of the jaw 4 and is actuated into closed position by a combined starting and guard element that comprises two plate sections 72 and 73 that are connected together by straps 74 with one disposed in front of the stationary jaw 4 and the other located in front of or beneath the movable jaw 10. These plates are formed of heat insulating material to protect the fingers of the operator from contact with the jaws when they are heated, for example, by electrical heating elements 75 in the usual way. The plate 72 has an approximately U-shaped bracket 76 on the rear side thereof, the arms of which are pivotally connected to the respective pins 77 mounted in the flanges 6 of the jaw 4. These arms are also slidable longitudinally of said pins and are normally yieldingly held against movement in both directions by compression springs 78. One of the arms of the bracket 76 has an inturned end extension 79 that abuts a ball 80 which is interposed between said extension and the operating stem 81 of the micro-switch 71 and is loosely supported by a bracket arm 82. The extension 79 also has a cam notch 83 in one edge thereof in which the ball 80 is normally seated, as best shown in Figures 11 and 12. One of the plates, in the present instance the plate 73, has a stud 84 projecting downwardly or outwardly from the outer face thereof adjacent one end, as shown in Figures 2 and 16.

With this arrangement, upon application of pressure by the hands of the operator against either of the plates 72 and 73 in the direction to swing the plates about the pins 77, the ball 80 will be pushed against the stem of the micro-switch so as to close the switch and energize the winding of the electromagnet 70. If desired, instead of pressing the plates 72 and 73, the operator may press against the stud 84 so as to slide the plates on the pins 77 against the influence of one of the springs 78, whereupon the extension 79 of the bracket 76 will be moved so that the sides of the cam notch 83 will push the ball 80 to actuate the micro-switch. A pin 76a limits swinging of the lever.

When the electromagnet 70 is energized, the trip lever 63 is swung downwardly so that the teeth 62 raise the valve-actuating rod 54 upwardly to permit the starting valve 50 to close; and thereupon, the hydraulic closing of the jaws hereinabove described takes place. To hold the rod in this position, a detent 85 is pivotally mounted at one end on the same pivot 66 upon which the bell crank 65 is pivoted, and has its other end bifurcated and straddling the pivot pin 64 with the extremity of one arm 86 of the bifurcation underlying the head 61 of the valve-actuating rod and the other arm 87 extending upwardly and engaged by a spring pressed plunger 88 which normally influences the detent to cause the arm 86 to engage the valve-actuating rod.

It is desirable to provide means for ensuring that the pressure shall be applied to the jaws for predetermined periods of time and that such periods shall be variable. For this purpose, I have shown a valve rod 90 that has a beveled or tapered end 91 (see Figure 13) located in a by-pass 92 which connects the duct 57 with a passage 93 that is in turn connected by a passage 94 to the lower end of a cylinder 95 (see Figure 5) in which is vertically reciprocable a trip piston 96 that is normally influenced downwardly in the cylinder by a compression spring 97 that surrounds a trip rod 98 which is carried by the piston and is adapted to be projected upwardly beyond the top of the machine frame into engagement with a finger 99 on one arm of the bell crank 65. The timing valve 90 is screw threaded in the frame, as indicated at 100, so that upon rotation thereof the beveled end will be adjusted in the by-pass 92 so as to vary the speed of flow of the liquid through the by-pass and thereby vary the time required for building up sufficient pressure beneath the trip piston 96 to actuate the same against the influence of the spring 97.

In operation, assuming that the high hydraulic pressure is being applied to the jaws, the liquid flows from the duct 57 through the by-pass 92 into the duct 93 and thence through the passage 94 into the cylinder 95 beneath the trip piston 96, When sufficient pressure has been built up to actuate the piston the latter is pushed upwardly so that the trip rod 98 engages the bell crank 65 and swings the latter to pull the arm 86 of the detent 85 from beneath the head 61 of the valve actuating rod, whereupon said rod is pushed downwardly by its spring 55 to open the starting valve 50 and shut off the hydraulic pressure from the operating pistons 23 and 32.

Figures 13, 14, 15, 22:
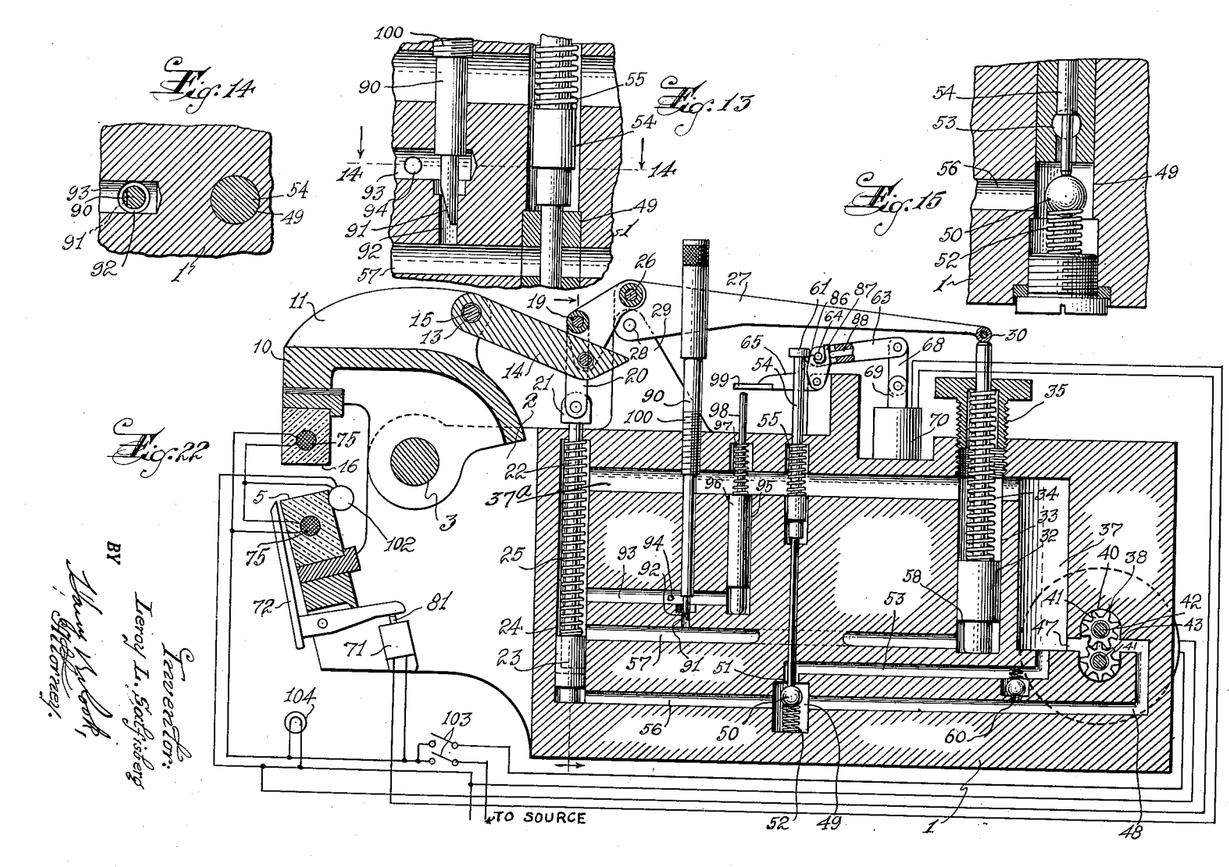
Figure 13 is an enlarged fragmentary vertical sectional view through the timing valve.
Figure 14 is a horizontal sectional view, on the plane of the line 14—14 of Figure 13.
Figure 15 is a fragmentary vertical sectional view of the starting valve.
Figure 22 is a schematic illustration of the hydraulic circuit and the electric circuit, showing the arrangement of the jaws illustrated in Figure 21.

It will be understood by those skilled in the art that where heaters are used in the sealing jaws, such as indicated at 75, these heaters will be connected in an electric circuit, as shown in Figure 22, and a suitable thermostatic switch 102 will be mounted on one of the jaws to maintain substantially uniform temperature. The circuits of the heaters may also be controlled by manually operated switches 103 and a signal light 104 may also be connected in the circuit and mounted at an easily visible position on the frame to indicate when the circuits are in proper operating condition.

Having thus described the invention, what I claim is:

1. A machine comprising a frame casting, relatively movable jaws mounted thereon to receive between them material to be pressed, mechanism for closing said jaws comprising a main operating device including a piston in a cylinder in said frame casting, linkage connecting said main operating device to said jaws, an auxiliary operating device including a piston in a cylinder in said frame casting connected to said linkage to initially close said jaws, means supplying power constituting a liquid reservoir and a hydraulic pumping system having an inlet from the reservoir and an outlet leading to one end of the said cylinder of the auxiliary device and a liquid return passage between said outlet and said reservoir, means for controlling application of said power to said auxiliary operating device to initially close said jaws including a starting valve to control communications between said outlet and said liquid return passage, means for selectively actuating said starting valve into a position to normally cause liquid to circulate freely through said outlet and said return passage substantially free of pressure and into another position to cause liquid to be forced under pressure to said cylinder of the auxiliary device, and means normally positively preventing application of power to said main operating device and providing for application of said power thereto at a predetermined point in the jaw closing operation of said auxiliary operating device including a passage from said cylinder of the auxiliary device to the cylinder of the main operating device, said piston of the auxiliary device being located normally to close said passage and at a predetermined point in the movement of said piston to open said passage so as to prevent and to permit flow of liquid from said reservoir into said passage, respectively, for controlling operation of said main operating device.

2. A machine as defined in claim 1, wherein said means for selectively actuating said starting valve comprises a valve-actuating device for normally actuating and holding said valve in the first-mentioned position, and means for automatically moving said actuating device to release said valve into the second-mentioned position and including detent mechanism for holding said valve-actuating device in valve-releasing position.

3. A machine as defined in claim 1, wherein said means for selectively actuating said starting valve comprises a valve-actuating device for normally actuating and holding said valve in the first-mentioned position, means for automatically moving said actuating device to release said valve into the second-mentioned position and including detent mechanism for holding said valve-actuating device in valve-releasing position, and with the addition of means for operating said detent mechanism after a predetermined period of time to release said valve-actuating device into said first-mentioned position.

4. A machine as defined in claim 1, wherein said means for selectively actuating said starting valve comprises a valve-actuating device for normally actuating and holding said valve in the first-mentioned position, means for automatically moving said actuating device to release said valve into the second-mentioned position and including detent mechanism for holding said valve-actuating device in valve-releasing position, and with the addition of a liquid pressure operated means for operating said detent mechanism to release said valve-actuating device into said first-mentioned position, and a timing valve for regulating the flow of liquid from said passage between the cylinders of said main and auxiliary operating devices to said liquid pressure operated means.

5. A machine comprising a frame having thereon relatively movable jaws to receive between them material to be pressed, means for opening and closing said jaws including main and auxiliary operating devices each including a piston in a cylinder, linkage connecting said main and auxiliary devices to said jaws so that said auxiliary devices will initially close the jaws after which said main device will continue the jaw-closing operation, a spring at one end of the piston and cylinder of each of said main and auxiliary devices to actuate said piston in one direction, a liquid reservoir, a pumping system having an inlet from the reservoir and an outlet leading to the other end of said cylinder of the auxiliary device and a liquid return passage between said outlet and said reservoir, a starting valve to control communication between said outlet and said return passage, a reciprocable valve-actuating rod spring pressed in one direction to actuate said valve into the position to permit free circulation of liquid through said outlet and said return passage substantially free of pressure, means for moving said valve-actuating rod in the other direction to release said valve into another position to cause liquid to be forced under pressure to said cylinder to the auxiliary operating device to move the piston therein in one direction adjacent said spring, a passage from said cylinder of the auxiliary device intermediate the ends thereof to the other end of the cylinder of the main operating device, said piston of the auxiliary device being arranged normally to prevent flow of liquid from its said cylinder into said passage and to permit such flow of liquid at a predetermined point in the movement of said piston of the auxiliary device for actuating the piston of said main operating device.

6. A machine as defined in claim 5, with the addition of detent mechanism for holding said valve-actuating rod in its valve-releasing position, and means for operating said detent mechanism to release said valve-actuating rod after a predetermined period of time.

7. A machine as defined in claim 6, wherein the last-named means includes a liquid pressure operated device, and a duct for conducting liquid from said liquid passage to said liquid pressure operated device to operate the latter, and a timing valve for regulating the flow of liquid through said duct.

8. A machine comprising a frame having thereon relatively movable jaws to receive between them material to be pressed, means for opening and closing said jaws including main and auxiliary operating devices each including a piston in a cylinder, linkage connecting said main and auxiliary devices to said jaws so that said auxiliary devices will initially close the jaws after which said main device will continue the jaw-closing operation, said linkage including two toggle links one of which is pivotally connected at one end to one of said jaws and at its other end to the other link, a thrust link connected at one end to said piston of the auxiliary device and at its other end to the second-mentioned toggle link intermediate the ends thereof, said toggle links being constructed to limit their relative pivotal movement in one direction so that they can act as a unitary rigid link, a bell crank lever pivoted intermediate its arms on said frame and pivotally connected at one end to the other end of the second toggle link, the other arm of said bell crank having operative engagement with the piston of the main operating device so that movement of said piston in one direction will close said jaws, and means for controlling supply of hydraulic pressure to said auxiliary and main operating devices.

9. A machine of the character described, comprising relatively movable jaws, a liquid pressure operated piston and cylinder device operatively connected to said jaws, for closing them, a starting valve and liquid passages controlled thereby for controlling application of liquid under pressure to said device to open and close said jaws, a valve-actuating device for controlling movement of said valve into one position to start and into another position to stop application of pressure to said jaws, a detent for holding said valve-actuating device in the position to start closing of said jaws, a liquid pressure operated device for operating said detent to release said valve-actuating device, and a timing valve for regulating flow of liquid to said liquid pressure operated device.

10. A machine of the character described, comprising relatively movable jaws, a liquid pressure operated piston and cylinder device operatively connected to said jaws, for closing them, a starting valve and liquid passages controlled thereby for controlling application of liquid under pressure to said device to close said jaws, a reciprocable valve-actuating rod spring-pressed in one direction to actuate said valve into one position to stop application of pressure to said jaws, a lever operatively engaging said rod upon swinging of the lever in one direction to move said valve-actuating rod in the other direction and release said valve into another position to start application of pressure to the jaws, a detent for holding said rod in said valve-releasing position, and means for actuating said detent after a predetermined time to release said valve-actuating rod.

11. A machine of the character described, comprising relatively movable jaws, a liquid pressure operated piston and cylinder device operatively connected to said jaws, for closing them, a starting valve and liquid passages controlled thereby for controlling application of liquid under pressure to said device to close said jaws, a reciprocable valve-actuating rod spring-pressed in one direction to actuate said valve into a position to stop application of pressure to said jaws, a lever operatively engaging said rod upon swinging of the lever in one direction to move said valve-actuating rod in the other direction and release said valve into another position to start application of pressure to the jaws, an electromagnet for swinging said lever in said direction and a spring for swinging the lever in the other direction, a switch controlling said electromagnet, and a lever for actuating said switch and having an operating portion disposed adjacent one of said jaws to be engaged and moved by the hand of the operator as material to be pressed is inserted between said jaws.

12. A machine as defined in claim 11, with the addition of a detent for holding said rod in said valve-releasing position, and means for actuating said detent after a predetermined time to release said valve-actuating rod.

13. A machine comprising a frame, relatively movable jaws thereon to receive between them material to be pressed, power means for closing said jaws, a starting element for said power means and means for actuating said starting element including a lever mounted to swing about and to move longitudinally of an axis, and having an operating portion engageable by the hand of the operator to swing about or to move longitudinally of said axis at the will of the operator, means for transmitting either of said movements of said lever to said starting element and including a reciprocable member one end of which engages said starting element, and a cam device on said lever engaging the other end of said reciprocable member.

14. A machine comprising a frame, relatively movable jaws thereon to receive between them material to be pressed, power means for closing said jaws, a starting element for said power means and means for actuating said starting element including a lever mounted to swing about and to move longitudinally of an axis, and having an operating portion engageable by the hand of the operator to swing about or to move longitudinally of said axis at the will of the operator, means for transmitting either of said movements of said lever to said starting element and including a ball, a device on said lever, means mounting said ball for lateral movement and between and in engagement with said starting element and said device so that upon swinging of said lever said device will push said ball against said starting element, said device having a cam surface to engage and push said ball against said starting element upon longitudinal movement of said lever.

LEROY L. SALFISBERG.

REFERENCES CITED

The following references are of record in the file of this patent:

UNITED STATES PATENTS

| Number | Name | Date |
|---|---|---|
| 2,356,610 | Penney | Aug. 22, 1944 |
| 2,376,253 | Humphrey | May 15, 1945 |
| 2,402,298 | Salfisberg | June 18, 1946 |
| 2,476,629 | Salfisberg | July 19, 1949 |
| 2,542,900 | Chaffee | Feb. 20, 1951 |